May 8, 1928.　　　　W. E. BLAIR ET AL　　　　1,669,280
AUTOMATIC SHUT-OFF DEVICE
Filed Oct. 7, 1925
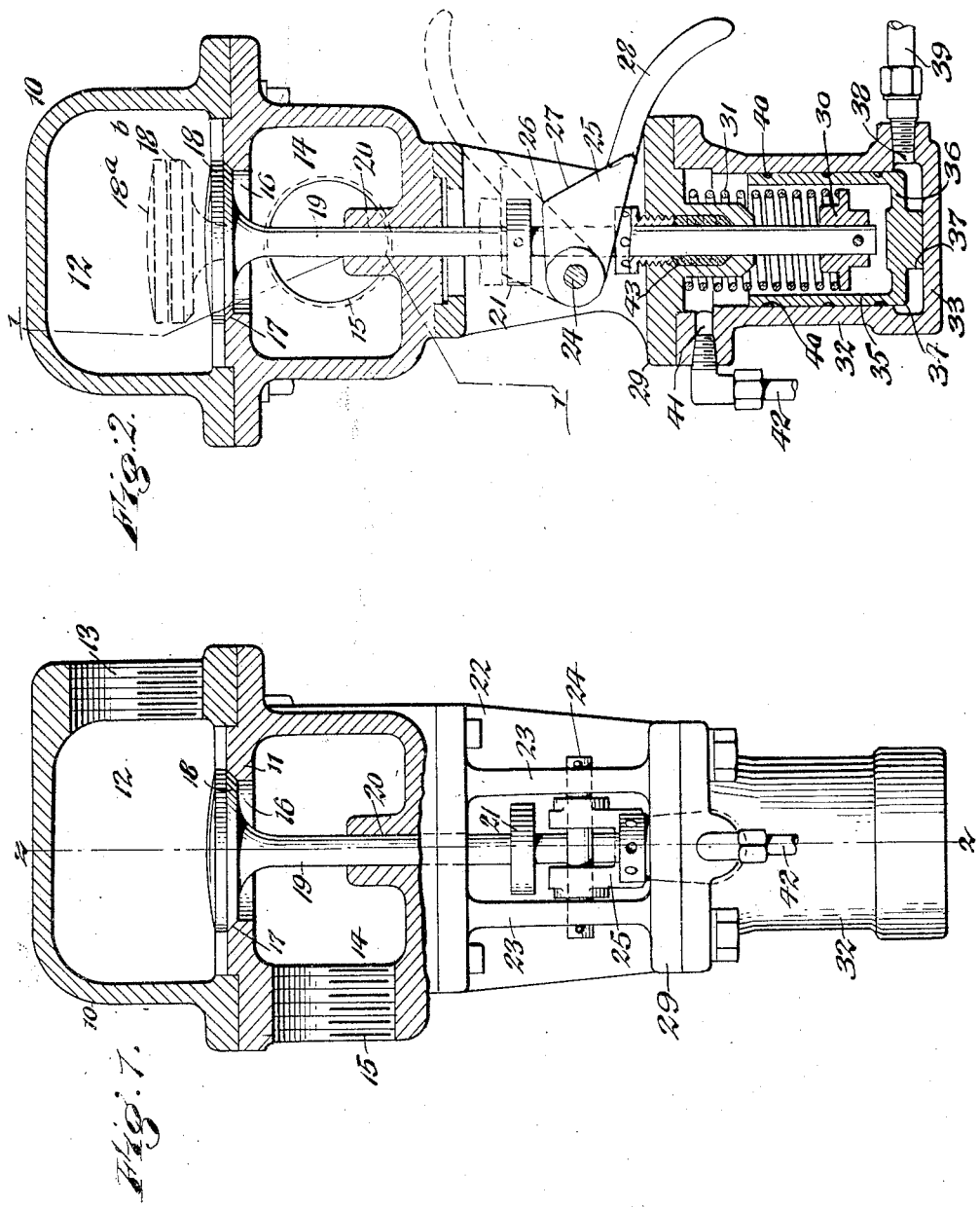

Patented May 8, 1928.

1,669,280

UNITED STATES PATENT OFFICE.

WILLIAM E. BLAIR AND VALENTINE D. KAUTH, OF BUFFALO, NEW YORK.

AUTOMATIC SHUT-OFF DEVICE.

Application filed October 7, 1925. Serial No. 61,103.

This invention relates to an automatic shut-off device which is more particularly designed for automatically shutting off the supply of gas or other fluid fuel to a gas engine when the same ceases to operate either when stopping the engine at will or when the same is stopped by reason of a cessation of fuel supply, failure of the ignition system or other cause. At the present time the insurance underwriters require gas engines which are operated indoors to provide an automatic shut-off device of this character so that communication between the gas inlet of the engine and the source of supply is positively cut-off whenever the gas is stopped so that all liability of flooding the engine and the room in which the engine is installed is avoided, which otherwise might result in an accumulation of gas and an explosion and the same cause loss of property and personal injury.

It is the object of this invention to provide an automatic shut-off device for gas engines and similar installations, which can be readily set when starting the engine so as to permit proper flow of the gaseous fuel from the source of supply to the inlet of the engine and which will be automatically held open so long as the engine is in operation but will automatically close the instant that the engine ceases to operate and can only be again restored to its operative condition by manually actuated means.

The preferred organization which forms the subject of this invention whereby this result is accomplished, consists generally of a valve arranged in the conduit leading from the source of supply to the inlet of the gas engine, manually operated means whereby this valve may be opened to permit a flow of fuel from the source of supply to the engine, retaining means which hold the valve open and which are responsive to continuous pressure, such as a pressure of the lubricating system, and means which effect an automatic closing of the valve when said continuous pressure is arrested, said closing means consisting preferably of a spring which operates upon said valve to hold the same yieldingly in its closed position.

In the accompanying drawings:—

Figure 1, is a side elevation, partly in section of an automatic shut-off device embodying our invention, the sectional portion of this device being taken on line 1—1, Fig. 2.

Figure 2, is a vertical section taken on line 2—2, Fig. 1.

Similar characters of reference refer to like parts in both figures.

The numeral 10 represents the valve casing of this automatic shut-off device which is provided with an internal partition 11 which divides the same into an inlet chamber 12, having an inlet 13 which receives the combustible fluid such as gas or the like from any suitable source, and an outlet chamber 14 having an outlet 15 which is connected by any suitable piping or conduit with the fuel inlet of the gas engine which is to be served. The partition, 11, is provided with a port 16, the upper end of which is provided with an annular conical valve seat 17. This port is opened and closed for the purpose of either placing the inlet and outlet chambers 12 and 14 in communication with each other or interrupting such communication by means of a conical valve 18 which is movable toward and from the valve seat 17 and the port in the partition 11, although other forms of valves may be used. This valve is guided in its movement by means of a valve stem 19 projecting downwardly from the under side of the valve to the interior of the casing, and guided with its central part in a guideway 20 on the lower part of the valve casing.

Means are provided whereby the valve may be opened manually preparatory to starting the operation of the engine, which means in their preferred form as shown in the drawings, comprise a collar 21 secured to the central part of the valve stem 19 below the bottom of the valve casing, a bracket 22 depending from the under side of the valve casing and having two arms 23, 23 arranged vertically on opposite sides of the central part of the valve stem, a horizontal pivot pin 24 arranged transversely along one side of the valve stem below the collar 21, a cam 25 pivoted on the pin 24 and having a salient face 26 which upon raising the cam is caused to engage the under side of the collar 21 and raise the same to such a position in which the valve 18 is lifted from its seat and a flat tangent face 27 which is adapted to engage the under side of the collar 21 and become interlocked therewith so as to maintain the valve 18 in its open position, and a handle or finger piece 28 projecting laterally from the cam and adapted to be grasped by the hand of the operator for raising the cam and causing the same to open the valve.

Means are provided which are adapted to move the cut-off valve quickly into its closed position when the same is free to do so and hold the same yieldingly in this closed position, which closing means in the present instance preferably consist of a lower head 29 arranged at the lower end of the arms 23, 23 and forming a part of the bracket 22, and provided centrally with a guideway in which the central part of the valve stem slides, an abutment collar 30 secured to the lower end of the valve stem, and a spring 31 surrounding the lower part of the valve stem and bearing at its upper end against the under side of the bracket head 29 and at its lower end against the collar 30. The resilience of this spring 31 operates to draw the valve stem downwardly and move the valve into its closed position whenever the same is free to do so and to yieldingly hold the same in this position.

Means are provided whereby the valve is held in its open position so long as the engine is in operation and the latter furnishes the necessary power for creating a pressure which serves to hold the valve open but which permits this valve to close automatically the instant that the engine ceases to operate and, therefore, discontinues furnishing the necessary power for generating the pressure necessary for holding the valve open. The preferred means which are shown in the drawings for accomplishing this purpose are constructed as follows:—

The numeral 32 represents a cylinder which surrounds the lower end portion of the valve stem and is closed at its upper end by the head 29 of the bracket 22 while its lower end is closed by a head 33. Within this cylinder is arranged a cup-shaped piston 34 which is adapted to slide vertically therein, the cylindrical wall 35 of this piston surrounding the lower part of the valve stem and the spring 31 while the head 36 of this piston is arranged below the valve stem and is provided with a supporting teat or projection 37 adapted to engage with the lower head 33 of the cylinder when the piston is in its lowermost position. The space in the lower end of the cylinder and below the piston therein is provided with a pressure inlet 38 which is adapted to be connected by means of a conduit 39 with any pressure source which is adapted to be generated by power derived from the working of the engine which is supplied by fuel passing through this cut-off device. This pressure source preferably consists of the lubricating system of the gas engine of which this shut-off device forms a part. Lubricating systems of this general character usually consist of a pump which is operated by power derived from the respective gas engine and which draws oil from the reservoir in the lower part of the crank case and discharges the same by means of conduits leading in various directions to the several bearings of the engine, and other parts which require lubrication. The pressure pipe 39 is connected with any suitable portion of the distributing conduits on the outlet side of the lubricating pump (not shown) so that the pressure in the lower end of the cylinder 32 is the same or substantially the same as the pressure under which the oil is forced by the pump to the various parts or surfaces which are to be lubricated. It, therefore, follows that the piston within the cylinder is responsive to the same pressure as the oil which is being circulated in the lubricating system of the engine whereby this piston is raised in the cylinder whenever the lubricating pump is in operation but when the working of the lubricating pump is discontinued the piston 34 is relieved from pressure. When, therefore, the piston 34 is raised by fluid pressure against the under side of the same the head 36 of the piston engages the lower end of the valve stem 19 and holds the shut-off valve 18 in its uppermost or fully opened position, as indicated by the uppermost dotted line 18$^a$ in Fig. 2. When, however, pressure against the lower end of the piston ceases due to a discontinuance of the working of the lubricating pump when the gas engine stops, then the piston 34 descends by gravity into its lowermost inoperative position aided by the resilience of the spring 31 which at the same time moves the shut-off valve downwardly into its closed position. The joint between the piston 34 and the bore of the cylinder is made reasonably tight by means of packing rings 40 arranged on the periphery of the piston so as to prevent an undue amount of oil under pressure from passing from the lower end of the cylinder through the joint between the piston and cylinder to the upper end thereof. Any oil, however, which does escape to the upper end of the cylinder escapes through an outlet 41 at the upper end of the cylinder and is conducted by a return pipe 42 to the crank case of the engine or other source from which the lubricating pump draws its supply for transmission to the various parts of the engine which are to be lubricated, thereby keeping this oil which is diverted from the lubricating system through the cylinder of the automatic shut-off device constantly in circulation and preventing the same from being wasted. In order to prevent any oil from escaping through the guideway between the upper head 29 of the cylinder and the piston rod 19, this guideway is preferably constructed in the form of a stuffing box 43, as shown in Fig. 2.

In the position of the parts shown by full lines in the figures of the drawing, the shut-off valve 18 is in its lowered or fully closed position, the cam 25 is turned downwardly into its inoperative position in which its salient face 27 is out of engagement from the lifting collar 21 and the handle 28 is arrested by engagement with the upper side of the head 29 and the piston is in its lowermost position in which its lug 37 engages with the lower head of the cylinder. In this position of the parts the passage of combustible gaseous fuel of fluid from the source of supply to the inlet of the gas inlet is positively cut off. For the purpose of starting the engine it is now first necessary to raise the lifting cam 25 from the position shown by full lines in Fig. 2 to the position shown by dotted lines in the same figure whereby the shut-off valve will be raised to the position shown by dotted lines 18$^b$ in Fig. 2, whereby the port 16 in the valve casing is opened and fuel gas is permitted to flow from the source of supply to the inlet of the engine.

After the valve 18 has been thus raised by the salient part 26 of the cam the tangential flat locking face 27 of this cam engages with the under side of the lifting cam whereby this cam remains in its upper operative position and the valve is held in its open position without the necessity of the attendant holding the cam in this position by hand.

The gas engine may now be started either by manual means or by a power starter such as are now commonly employed for this purpose. After the engine has been started the oil circulating pump which is actuated by power derived from the engine produces a pressure in the lubricating system of the engine on the outlet side of the pump. This pressure is in part conducted to the lower end of the cylinder 32 by means of the pressure pipe 39 whereby the piston 34 is raised and by engagement of the lower end of the valve stem 19 causes the valve 18 to be raised into its uppermost or fully open position, as indicated by dotted lines 18$^a$ and also causes the spring 31 to be compressed or placed under increased tension. During such lifting of the valve under the pressure derived from the lubricating system of the engine this valve is raised above the position where the same was lifted by the lifting effect of the cam 25. When this occurs the cam 25 loses its hold on the lifting collar 21 and is thereby released from engagement therewith whereby the cam together with its handle are permitted to drop automatically by gravity out of engagement from the lifting collar 21 and into its lowermost position indicated by full lines in Fig. 2. The cam 25, is therefore, at this time moved downwardly and into such a position where the same is out of the way and will not interfere with the free descent of the valve 18 into its lowered or closed position under the effect of gravity aided by the spring 31 whenever the valve is free to do so. This freedom occurs whenever the engine in which this cut-off device is incorporated ceases to operate, inasmuch as such a cessation terminates the generation of power which operates the lubricating pump and, therefore, arrests the further generation of pressure in the lubricating system which is utilized to raise the piston 34 and due to the absence of this pressure the piston 34 and valve 18 are caused to descend and automatically shut off the flow of gas through the casing by engagement of the valve with its seat 17.

After this valve has engaged this seat and shut-off the flow of gas from the source of supply to the inlet of the gas engine the latter can not be again started without first opening the shut-off valve 18 by deliberately raising the lifting cam 25, thereby preventing the flow of gas in the source of supply to the engine and flooding the latter or the engine room in which the same may be located if the attendant should fail to close the ordinary hand operated gas control valve which is usually provided on the engine for shutting off the fluid gas supply and stopping the engine.

It will therefore be apparent that by means of this automatic shut-off device the liability of accumulating explosive gases within the engine when the same is at rest or in the spaces adjoining thereto is positively prevented and that any accidents or injuries which might result from the ignition of such accumulated gases are avoided and absolute safety in the operation of the engine by gaseous fuels is assured.

We claim as our invention:—

1. An automatic shut-off device comprising a casing having a fluid inlet, a fluid outlet, and a valve seat between said inlet and outlet, a valve movable toward and from said seat and having a stem, a piston adapted to engage said valve stem and move the valve into an open position, a cylinder in which said piston slides and one end of which is adapted to be connected with a pressure source, and means for opening said valve manually comprising a collar arranged on said stem, and a cam adapted to engage said collar and having a handle for manipulating the same, said locking face being adapted to engage said collar upon turning the cam in one direction and said cam being released from said collar when pressure is applied to the underside of said piston.

2. An automatic shut-off device comprising a casing having a fluid inlet, a fluid outlet and a valve seat between said inlet and outlet, an inwardly closing valve movable toward and from said seat, a pressure cylinder having a pressure inlet at one end and a waste outlet at the other end, a piston arranged in said cylinder, a piston rod passing through said valve casing and said cylinder and connected at one end with said valve while its other end is adapted to be loosely engaged by said piston, a spring arranged in said cylinder and operating on said stem to move the valve in the direction for closing it, and a cam operating on said stem and adapted to open said valve and be held in its operative position when turned in one direction and to be released and permitted to turn in the opposite direction into its inoperative position when pressure is applied to the underside of said piston.

3. An automatic shut-off device comprising a casing having a fluid inlet, a fluid outlet and a valve seat between said inlet and outlet, an inwardly closing valve movable toward and from said seat, a pressure cylinder having a pressure inlet at one end and a waste outlet at the other end, a piston arranged in said cylinder, a piston rod passing through said valve casing and said cylinder and connected at one end with said valve while its other end is adapted to be loosely engaged by said piston, a spring arranged in said cylinder and operating on said stem to move the valve in the direction for closing it, a collar arranged on said stem between said casing and cylinder, and a cam pivotally mounted between said casing and cylinder and having a handle for shifting the same manually, a cam face for engaging said collar and lifting the valve from its seat, and a locking face whereby said cam may be interlocked with said collar for holding said valve in its open position.

WILLIAM E. BLAIR.
VALENTINE D. KAUTH.